(12) United States Patent
Suga

(10) Patent No.: US 10,498,923 B2
(45) Date of Patent: Dec. 3, 2019

(54) FACSIMILE APPARATUS, METHOD OF CONTROLLING THE SAME, AND STORAGE MEDIUM

(71) Applicant: CANON KABUSHIKI KAISHA, Tokyo (JP)

(72) Inventor: Daisuke Suga, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/100,907

(22) Filed: Aug. 10, 2018

(65) Prior Publication Data

US 2019/0075216 A1 Mar. 7, 2019

(30) Foreign Application Priority Data

Sep. 1, 2017 (JP) .................................. 2017-168834

(51) Int. Cl.
*H04N 1/327* (2006.01)
*H04M 11/06* (2006.01)
*H04N 1/00* (2006.01)

(52) U.S. Cl.
CPC ...... *H04N 1/32763* (2013.01); *H04M 11/066* (2013.01); *H04N 1/00302* (2013.01); *H04N 1/32708* (2013.01); *H04N 1/32726* (2013.01); *H04N 1/32728* (2013.01); *H04N 1/32745* (2013.01)

(58) Field of Classification Search
USPC ........................................................ 379/100
See application file for complete search history.

(56) References Cited

U.S. PATENT DOCUMENTS

2006/0251241 A1* 11/2006 Lee .................... H04N 1/00885
379/399.01
2011/0019813 A1* 1/2011 Miura .................. H04M 11/066
379/377

FOREIGN PATENT DOCUMENTS

JP 2016-225936 12/2016

* cited by examiner

*Primary Examiner* — Maria El-Zoobi
(74) *Attorney, Agent, or Firm* — Venable LLP

(57) ABSTRACT

The facsimile apparatus of the present invention, and the method of controlling the same, switches a connection between a telephone device and a telephone line between connected and cut off, has a power supply for supplying power to the telephone device, and, in a state where the telephone device and the telephone line are connected and supply of power from the power supply to the telephone device is stopped, in a case that an off-hook of the telephone device is detected by a detection unit for detecting an off-hook and an on-hook of the telephone device, controls to start supply of power from the power supply to the telephone device.

8 Claims, 12 Drawing Sheets

FIG. 10

| RECEPTION MODE SETTING VALUE | RECEPTION MODE |
|---|---|
| 0 | AUTOMATIC RECEPTION |
| 1 | FAX/TEL SWITCHING |
| 2 | MANUAL RECEPTION |

| RINGING MODE VALUE | RINGING MODE | H-RELAY CONTROL |
|---|---|---|
| 0 | RINGING | OFF (POWER REDUCTION) |
| 1 | NON-RINGING | ON |

| INTERNAL POWER SUPPLY SETTING VALUE | INTERNAL POWER SUPPLY SETTING | INTERNAL POWER SUPPLY CONTROL |
|---|---|---|
| 0 | ON | OFF (POWER REDUCTION) |
| 1 | PERFORM | ON |

FACSIMILE APPARATUS, METHOD OF CONTROLLING THE SAME, AND STORAGE MEDIUM

BACKGROUND OF THE INVENTION

Field of the Invention

The present invention relates to a facsimile apparatus, a method of controlling the same, and a storage medium.

Description of the Related Art

In recent years, multi-function peripherals provided with a facsimile communication function and a phone call function in accordance with a handset (an external telephone with no numeric keypad), in addition to functions such as printing and copying, have been spreading widely. In order to perform facsimile communication, a multi-function peripheral is connected to a PSTN (Public Switched Telephone Network), and, when there is a call from a transmitting side to a receiving side, a call signal is outputted from an exchanging system of a telephone company to the receiving side. When the receiving side is a multi-function peripheral and a handset is connected to the multi-function peripheral, a setting for the handset to ring at the time of a call is referred to as a ringing mode, and a setting for the handset not to ring is referred to as a non-ringing mode. In the non-ringing mode, a relay is used, and, by turning the relay on, control for disconnecting the handset from the telephone line is performed. Because a direct-current voltage is not supplied from the telephone line when the handset is disconnected from the telephone line, a direct current is supplied from inside the multi-function peripheral instead, and an off-hook of the handset is detected. In contrast, in the ringing mode, by turning the relay off, control for connecting the handset to the telephone line is performed. In such a case, because a direct-current voltage is supplied from the telephone line to the handset, it is possible to detect an off-hook of the handset even though the relay is turned off. In this way, the non-ringing mode and the ringing mode are changed and used in accordance with an intended use by a user.

The ringing mode is often used when the user wishes to, when the handset rings at a time of an incoming call, take the handset off the hook, listen to an incoming call tone, and thereby determine whether this is a phone call or an incoming call for a facsimile. In contrast, the non-ringing mode is often used in a case where the user wants to automatically receive a facsimile without the handset ringing at the time of an incoming call and in a case of FAX/TEL switching in which it is automatically determined whether there is a facsimile communication or a phone call with a counterparty, and the handset is allowed to ring in the case of a phone call.

In addition, in response to the broadening demand for power saving to suppress power consumption, there is an increasing need to have a multi-function peripheral stand by with as low power consumption as possible, even when the multi-function peripheral is in a standby mode in which it can be operated. For example, Japanese Patent Laid-Open No. 2016-225936 recites a control method for reducing power consumption by turning an internal power supply off and turning off a relay (connecting a telephone device to a line) when a ringing mode is instructed.

However, with the foregoing method, when the ringing mode is instructed, the following problem occurs when the handset is raised at a time of the ringing mode and a call is made by dialing a numeric keypad. When a user inputs a telephone number in a facsimile apparatus, a modem or an SDAA (silicon DAA) is controlled to output a dial signal, but there is control that is performed before this. Firstly, direct current capture is performed by the modem or the SDAA. Because there is an influence on an output level when a DTMF signal is outputted while the handset is connected to the telephone line, control for turning the foregoing relay on and disconnecting the handset from the telephone line is performed before outputting the dial signal. Because there is an influence on a waveform even with pulse dialing, the same applies. Because the handset is cut off from the telephone line when the relay is turned on, power supply to the handset is turned off, and current for the off-hook detection unit of the handset is disconnected. This point is not considered in the foregoing method.

In a next-generation facsimile apparatus, setting default settings at a time of standby to a ringing mode for a handset that does not have numeric keypad dialing and has the internal power supply set to off has been considered in order to save power. When a user picks up the handset in this state, a numeric keypad dial screen is displayed on a console unit of the facsimile apparatus main body, and the user is enabled to input a telephone number of a counterparty. When the numeric keypad is used for dialing, the modem outputs a dial signal, but the relay is turned on to disconnect the handset and the line so as to not be affected by the handset during the output. Because the internal power supply is turned off in such a case, an off-hook detection unit mistakenly recognizes that the handset has been put on the hook. Due to this misrecognition, the dial input is cancelled part way through, and the user becomes unable to have a telephone call with the desired counterparty.

SUMMARY OF THE INVENTION

An aspect of the present invention is to eliminate the above-mentioned problem with conventional technology.

A feature of the present invention is to provide a technique for, in a state where a telephone device and a telephone line are connected and power supply to the telephone device is stopped, enabling a user to take a handset off-hook and input a dial.

According to a first aspect of the present invention, there is provided a facsimile apparatus, comprising: a detection unit configured to detect an off-hook and an on-hook of a connected telephone device; a switching unit configured to switch between connecting and cutting off a connection between the telephone device and a telephone line; a power supply configured to supply power to the telephone device via the switching unit; a memory device that stores a set of instructions; and a processor that executes the instructions stored in the memory device to: in a state where the telephone device and the telephone line are connected by the switching unit and supply of power to the telephone device from the power supply is stopped, control to start supply of power to the telephone device from the power supply when an off-hook of the telephone device is detected by the detection unit.

According to a second aspect of the present invention, there is provided a method of controlling a facsimile apparatus, the method comprising: detecting an off-hook and an on-hook of a connected telephone device; switching between connecting and cutting off for a connection between the telephone device and a telephone line; supplying power to the telephone device; and in a state where the telephone device and the telephone line are connected in the switching and supply of power from the power supply is stopped, controlling to start supply of power to the telephone device from the power supply when an off-hook of the telephone device is detected.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram for describing a configuration of a controller unit and a facsimile unit for when non-ringing is set and an internal power supply is on, and a setting of the multi-function peripheral according to the first embodiment is standing by.

FIG. 3 is a block diagram for describing a configuration of the controller unit and the facsimile unit for when there is a setting for ringing and the internal power supply is off, and the setting of the multi-function peripheral according to the first embodiment is standing by.

FIG. 4 is a flowchart for describing processing for when the multi-function peripheral according to the first embodiment is standing by, an internal power supply is set to off, and the ringing mode is on.

FIG. 5 is a flowchart for describing processing for when the multi-function peripheral according to a second embodiment is standing by, an internal power supply is set to off, and the ringing mode is on.

FIG. 6 is a flowchart for describing processing for when the multi-function peripheral according to a third embodiment is standing by, an internal power supply is set to off, and the ringing mode is on.

FIG. 10 depicts a view illustrating an example of tables in which are registered setting values for a reception mode, the ringing mode, and the internal power supply, which are stored in an HDD of the multi-function peripheral according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
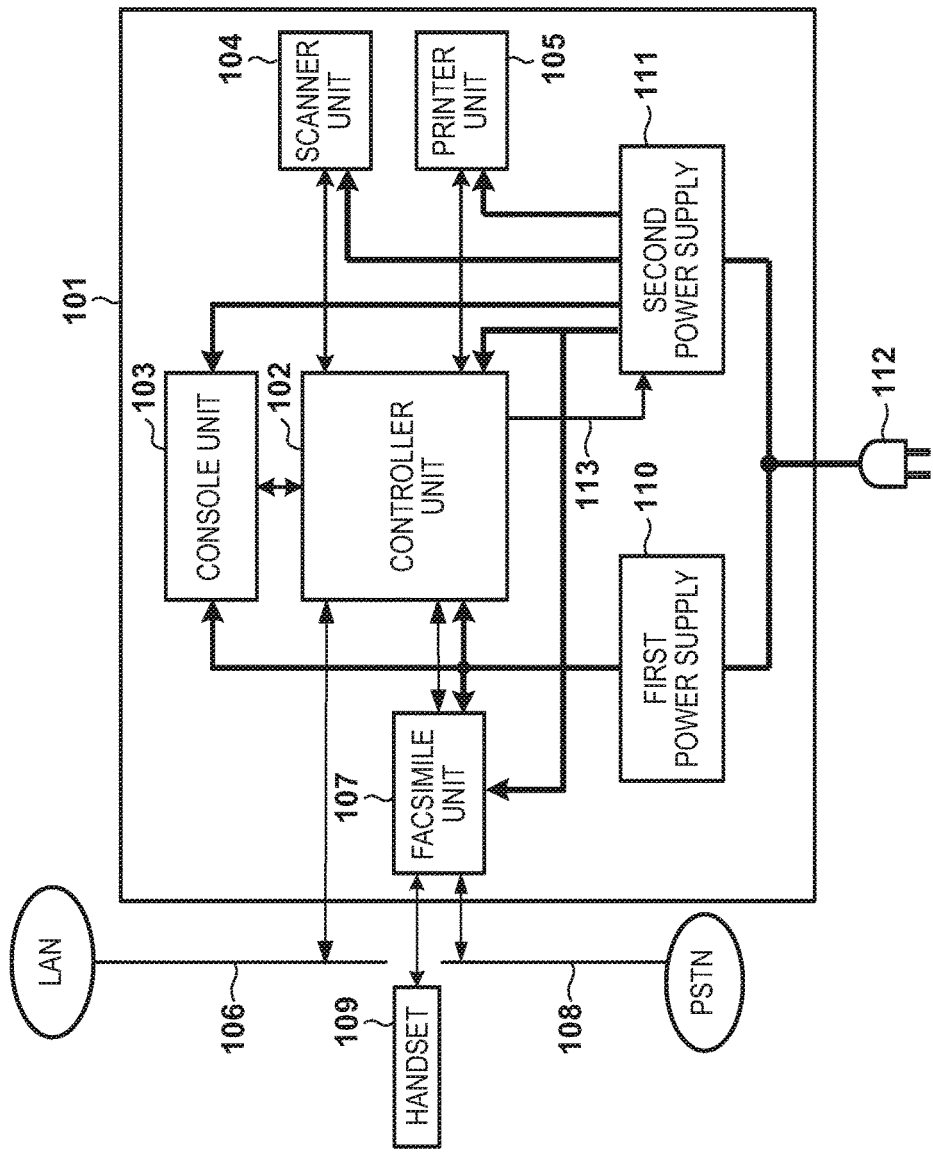
FIG. 1 is a block diagram for describing a configuration of a multi-function peripheral according to a first embodiment of the present invention.

FIG. 1 is a block diagram for describing a configuration of a multi-function peripheral 101 that includes a facsimile communication function according to a first embodiment of the present invention.

The multi-function peripheral 101, which includes the facsimile communication function, has, for example, a copying function and a printing function, in which a print job from a PC or the like is received via a network such as a LAN (Local Area Network) and is printed. A controller unit (a control unit) 102 controls various portions of the multi-function peripheral 101 and performs image processing operation of the multi-function peripheral 101, transmission/reception of data, transformation of data, saving data, power control, and the like. A console unit 103 includes an operation panel for a user to perform various operations and a display for displaying operation information, and the console unit 103 thereby provides a UI (a user interface) for the multi-function peripheral 101. A scanner unit 104 scans an image of a original and supplies image data thereof to the controller unit 102. A printer unit 105 prints and outputs an image based on various kinds of image data processed by the controller unit 102. A network cable 106 is connected to a LAN. A facsimile unit 107 is connected to an exchanging system (not shown) that is present in a PSTN via a telephone line 108. Additionally, it may be connected with a private branch exchange or an analog port of an optical router, without being directly connected to the exchanging system. A handset 109 is connected to a connection terminal arranged in the facsimile unit 107 of the multi-function peripheral 101. A phone call with a call destination is performed with the handset 109 and desired processing is performed by switching to facsimile communication after the phone call. The handset 109 is directly connectable with the telephone line 108, has functions for capturing a line when it is taken off-hook and for performing line disconnection when it is put on the hook, however it is assumed to be an external telephone device that does not include a numeric keypad for inputting a telephone number. A display of the console unit 103 of the multi-function peripheral 101 transitions to a numeric keypad dial screen when a user lifts the handset 109. A modem 211 (FIG. 2) of the facsimile unit 107 outputs a telephone number to the exchanging system by performing control such as a DTMF output when a user instructs a telephone number by the console unit 103. The destination telephone device is called by the exchanging system, and a phone call is possible if the destination responds.

A first power supply 110 and a second power supply 111 convert an alternating current commercial power supply supplied from a power plug 112 to a direct-current voltage which is used by each unit of the multi-function peripheral 101. Note, power from the first power supply 110 and the second power supply 111 is supplied to each unit in a normal operation mode (also referred to standby). However, when a transition is made to a power saving mode, the power output of the second power supply 111 is turned off by a power control signal 113 that is outputted from the controller unit 102.

In the power saving mode, when the controller unit 102 receives a job from an external apparatus, the controller unit 102 turns on power output by the second power supply 111 by switching the power control signal 113 in order to transition from the power saving mode to the standby mode.

Figure 2:
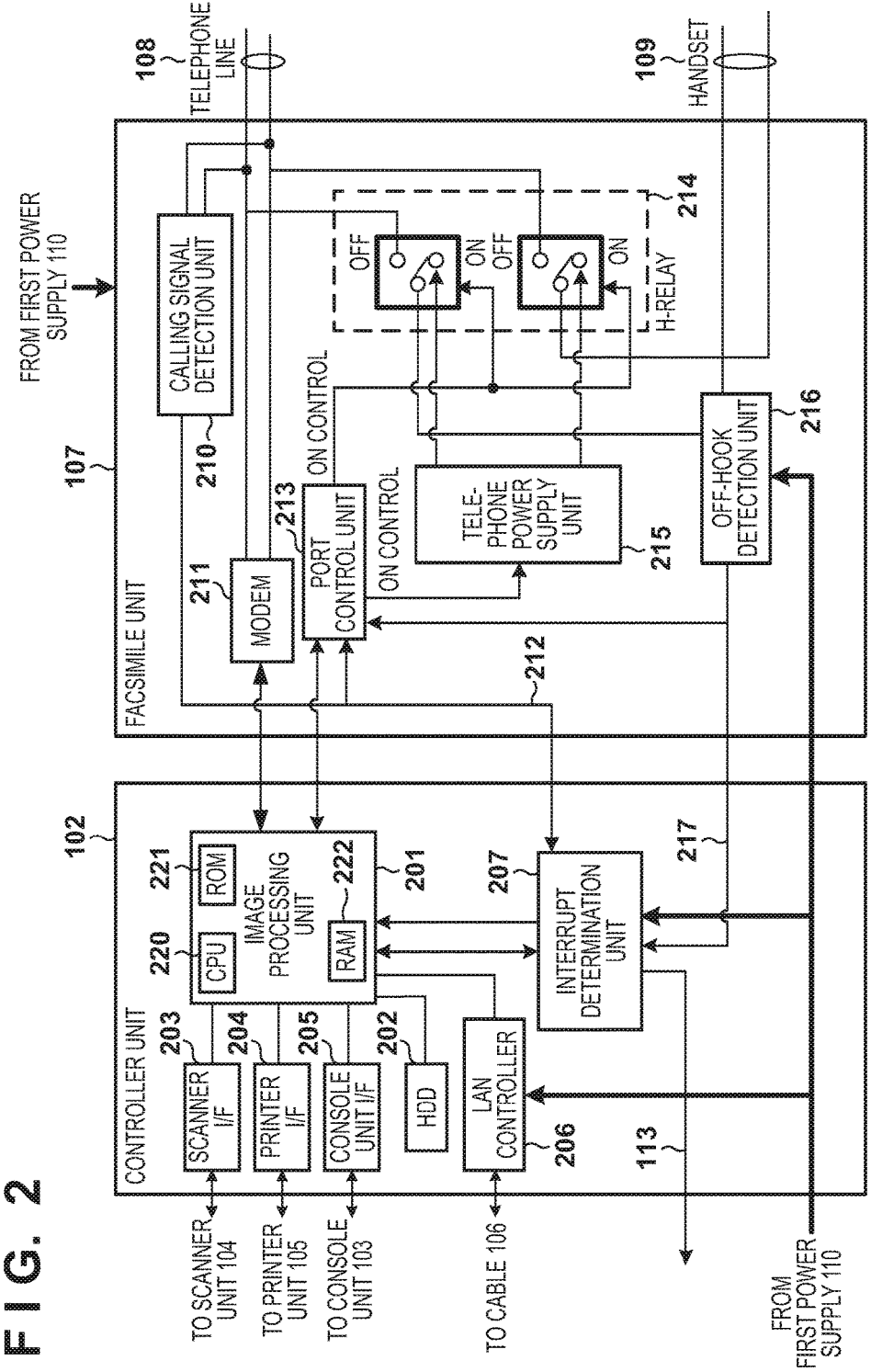

FIG. 2 is a block diagram for describing in more detail the configuration of the controller unit 102 and the facsimile unit 107 of the multi-function peripheral 101 according to the first embodiment. Here, in particular illustration is given for a state in which the multi-function peripheral 101 is set to be non-ringing (H-relay 214 is turned on) at a time of standby and the internal power supply is on (power supply of 24V direct current from a telephone power supply unit 215).

The image processing unit 201 of the controller unit 102 includes a CPU 220 for controlling internals of the image processing unit 201, a ROM 221, a RAM 222, an image processing circuit, and various I/F circuits. The CPU 220 performs various controls, which are described later, by deploying a program that is stored in the ROM 221 or in an HDD 202 to the RAM 222 and executing the program. For example, in accordance with various processing modes such as copying, printing, facsimile, and scanning, the CPU 220 performs control and exchange of data corresponding to a respective target unit, and executes control or desired image processing to thereby control operation of the multi-function peripheral 101.

The HDD (hard disk drive) 202 is used as a storage region or a work region for control programs and image data of the multi-function peripheral 101. Received image data is stored in the HDD 202 when a facsimile is received. Additionally, various settings of the multi-function peripheral 101 are stored in the HDD 202. A setting of the internal power supply and a ringing mode at a time of standby of the multi-function peripheral 101 can be set by an instruction of the console unit 103 and saved in the HDD 202.

Figure 12:
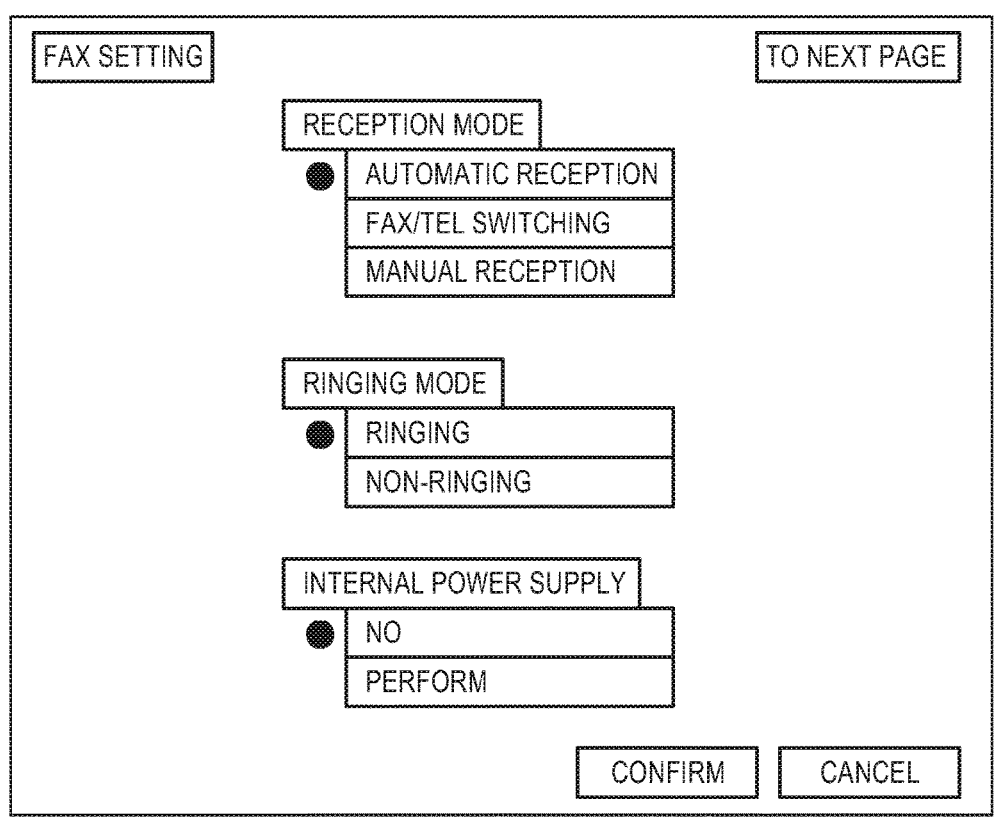
FIG. 12 depicts a view illustrating an example of a setting screen for facsimile that is displayed in a display of a console unit of the multi-function peripheral according to the first embodiment.

FIG. 12 depicts a view illustrating an example of a setting screen for facsimile that is displayed in a display of the console unit 103 of the multi-function peripheral 101 according to the first embodiment.

A user or a service person can set the ringing mode to "non-ringing" or "ringing", set an internal power supply setting to "no" or "perform", and save these settings in the HDD 202, as in this example of a setting screen. Additionally, the reception mode can be set to one of "automatic reception", "FAX/TEL switching", or "manual reception" and saved in the HDD 202.

FIG. 10 depicts a view illustrating an example of tables in which are registered setting values for a reception mode, the ringing mode, and the internal power supply, which are stored in the HDD 102 of the multi-function peripheral 101 according to the first embodiment.

A ringing mode value is saved as "1" when the ringing mode is set to non-ringing, the ringing mode value is saved as "0" when the ringing mode is set to ring, and the CPU 220 can change control after reading the saved value. In addition, an internal power supply setting value is saved as "1" when an internal power supply setting is set to "perform", and the internal power supply setting value is saved as "0" when the internal power supply setting is set to "no". In addition, a reception mode setting value is set to "0" when a reception mode is set to automatic reception, the reception mode setting value is set to "1" when the reception mode is set to FAX/TEL switching, and the reception mode setting value is set to "2" when the reception mode is set to manual reception. Note that configuration may be taken to save in a non-volatile memory (not shown) inside the image processing unit 201, instead of the HDD 202.

A scanner I/F 203, a printer I/F 204, and a console unit I/F 205 indicate I/Fs (interface) for connecting to the scanner unit 104, the printer unit 105, and the console unit 103, respectively. A LAN controller 206 is connected with the LAN via the network cable 106 and is a LAN controller for communicating with an external apparatus.

A calling signal detection unit 210 insulates a telephone call signal of an alternating current of about 75V and 16 Hz that arrives via the telephone line 108 in order to convert it so that it can be received by a normal digital circuit. It is possible to use an electric component such as a photocoupler in the calling signal detection unit 210, and when an alternating current signal greater than or equal to a certain voltage is applied, a signal that forms the call signal is inputted from the calling signal detection unit 210 to an interrupt determination unit 207 of the controller unit 102. Before outputting a normal call signal, the exchanging system inverts the polarity of a direct-current 48V, and then calls by a period that takes turning the call signal on for one second and off for two seconds as one set. The exchanging system then outputs by superimposing, on the direct current 48V, a 75V, 16 Hz alternating current signal during on times. In addition, the exchanging system maintains the direct current 48V during off times. When the facsimile captures the line, the exchanging system stops the call signal, a line connection is made for the transmitting side and the receiving side, and communication therebetween becomes possible.

The modem 211 performs a facsimile communication with the partner device via the telephone line 108, and is controlled by the CPU 220. The modem 211 and the image processing unit 201 are connected via an I/F, and the I/F between the image processing unit 201 and the modem 211 uses a serial bus or a parallel bus. In addition, the modem 211 performs modulation and demodulation of a facsimile signal, as well as transmission and reception of image data, tone detection, and DTMF detection. It is possible to have a circuit configuration in which the primary and secondary of the telephone line are insulated by a transformer and transfer a voice frequency band signal, and direct current capture of the telephone line is performed by CML (Connect Modem to Line) relay control. In addition, configuration may be taken to have a method where a semiconductor for performing A/D and D/A, called an SDAA (Silicon Data Access Arrangement), is arranged on a primary side of the telephone line 108, and the direct current capture is performed by controlling a transistor. A/D is an abbreviation of analog-to-digital conversion, and D/A is an abbreviation of digital-to-analog conversion. An SDAA arranged on the primary side of the line and an IC (not shown) arranged on the secondary side are together treated as the modem 211 in the embodiments. Insulation and signal transfer are performed by arranging an insulation circuit formed by an inductor or a capacitor between the SDAA arranged on the primary side of the line and the IC (not shown) arranged on the secondary side.

A signal 212 is a signal that the calling signal detection unit 210 outputs after forming a call signal outputted from the exchanging system, and is referred to as the CI signal 212 hereinafter. It is possible for the CPU 220 to read the CI signal 212, which is inputted to the interrupt determination unit 207, to determine on and off periods for the frequency of the call signal, and thereby determine whether or not a call signal has arrived. Configuration may also be such that the CI signal 212 is input to a port control unit 213 in parallel and the CPU 220 reads the port control unit 213 to determine on and off periods of the frequency of the call signal to thereby determine whether or not a call signal has arrived.

It is possible to use an IC or LSI having a GPIO (General Purpose Input Output) function for the port control unit 213. In addition, the CPU 220 controls an output port of the port control unit 213 to control the H-relay 214 or the telephone power supply unit 215. In a case where the port control unit 213 cannot directly drive the H-relay 214, a transistor may be inserted therebetween.

For the H-relay 214, when the multi-function peripheral 101 is set to the non-ringing mode, control for disconnecting the handset 109 from the telephone line 108 is performed by turning the H-relay 214 on at a time of standby. While the H-relay 214 is kept in the on state, approximately 0.2 W of power is consumed. By turning the H-relay 214 off when the multi-function peripheral 101 is set to the ringing mode, control for connecting the handset 109 to the telephone line 108 is performed. When the H-relay 214 is turned off, the handset 109 will ring even when a fax is received, but it is possible to reduce power consumption by approximately 0.2 W.

An off-hook detection unit 216 detects off-hook of the handset 109. It outputs a signal that is transformed so that it is possible to insulate the voltage of the telephone line 108, and be received by a normal digital circuit. It is possible to use a photocoupler or the like for the off-hook detection unit 216. An approximately 48V direct-current voltage is supplied from the exchanging system when the H-relay 214 is turned off, the handset 109 has a resistance value of 50 to 300Ω in Japan when off-the-hook, and being raised off-hook is detected by a current of approximately 20 mA or more flowing to the photocoupler. The handset 109 has a resistance value of 1 MΩ or more when on-hook, and the handset 109 being placed on-hook is detected by the current for the photocoupler cut off.

A signal 217 is an output signal that is formed by the off-hook detection unit 216, and is hereinafter referred to as the hook signal 217. It is possible to detect that an off-hook has occurred by the signal 217 being inputted from the off-hook detection unit 216 to the interrupt determination unit 207 of the controller unit 102. The hook signal 217 is inputted to the port control unit 213 in parallel, and the CPU 220 may read the port control unit 213 to determine whether the handset 109 is in a lifted state (off-hook), or in a state of being placed on the hook (on-hook).

For the off-hook detection unit 216, because power is not supplied from the telephone line 108 when the H-relay 214 is on, it is possible to supply power from the telephone power supply unit 215 instead. It is possible to configure the telephone power supply unit 215 to control a +24V output, stop, and perform a −150V output in accordance with port control, by using an insulated DC-DC converter or the like. When standing by, a direct current 24V is supplied from the telephone power supply unit 215 of the multi-function peripheral 101, and it is possible to detect off-hook (raising) of the handset 109. In addition, when a FAX/TEL switching mode is set, direct current 24V are supplied from the telephone power supply unit 215, but, at the time of incoming call processing, the CPU 220 automatically determines whether there is a facsimile communication or a phone call from a counterparty. Configuration may be taken to, if it is determined that there is a phone call, cause a pseudo call signal (for example, one caused to change in a certain period between +24V and −150V) that causes the handset 109 to ring to be generated from the telephone power supply unit 215. When the telephone power supply unit 215 is turned on and outputs +24V, for the duration of the output approximately 1 W of power is consumed. When the telephone power supply unit 215 is stopped, it ceases to be possible to detect off-hook of the handset 109, but it is possible to eliminate approximately 1 W of power consumption. The value of eliminated power consumption differs in accordance with the circuit configuration.

The interrupt determination unit 207 is a circuit that detects an activation trigger for causing the controller unit 102, which includes the image processing unit 201, to activate from the power saving mode. The interrupt determination unit 207 is connected to the calling signal detection unit 210, and the CI signal 212 changes when there is a change in the call signal. The interrupt determination unit 207 is connected with the off-hook detection unit 216, and the hook signal 217 changes when the handset 109 is off-hook. In the case of a power saving mode, the power control signal 113 is controlled to cause the second power supply 111 to turn on. When the second power supply 111 is turned on, firstly the interrupt determination unit 207 is ignored even in the CI signal 212 repeatedly changed thereafter, and the state of the power control signal 113 is maintained. Subsequently, the CPU 220 does not treat the call signal as an interrupt activation trigger until a transition is made to the power saving mode again. The CPU 220 can also determine whether or not there is a call from a telephone line by reading a signal state of the interrupt determination unit 207.

Power supplied at a time of standby is supplied to the entirety of the multi-function peripheral 101 from the first power supply 110 and the second power supply 111, and all functions of the multi-function peripheral 101 can be used. In the power saving mode, power is supplied from the first power supply 110 to some elements of the configuration illustrated in FIG. 1 and FIG. 2, and only a few elements which can detect an activation trigger enter an energized state. A transition from standby to a power saving mode is performed by the CPU 220 when predetermined conditions are satisfied, such as there being no job for a certain amount of time period. A transition is made to the power saving mode by turning the second power supply 111 off by the power control signal 113 outputted from the controller unit 102.

Figure 3:
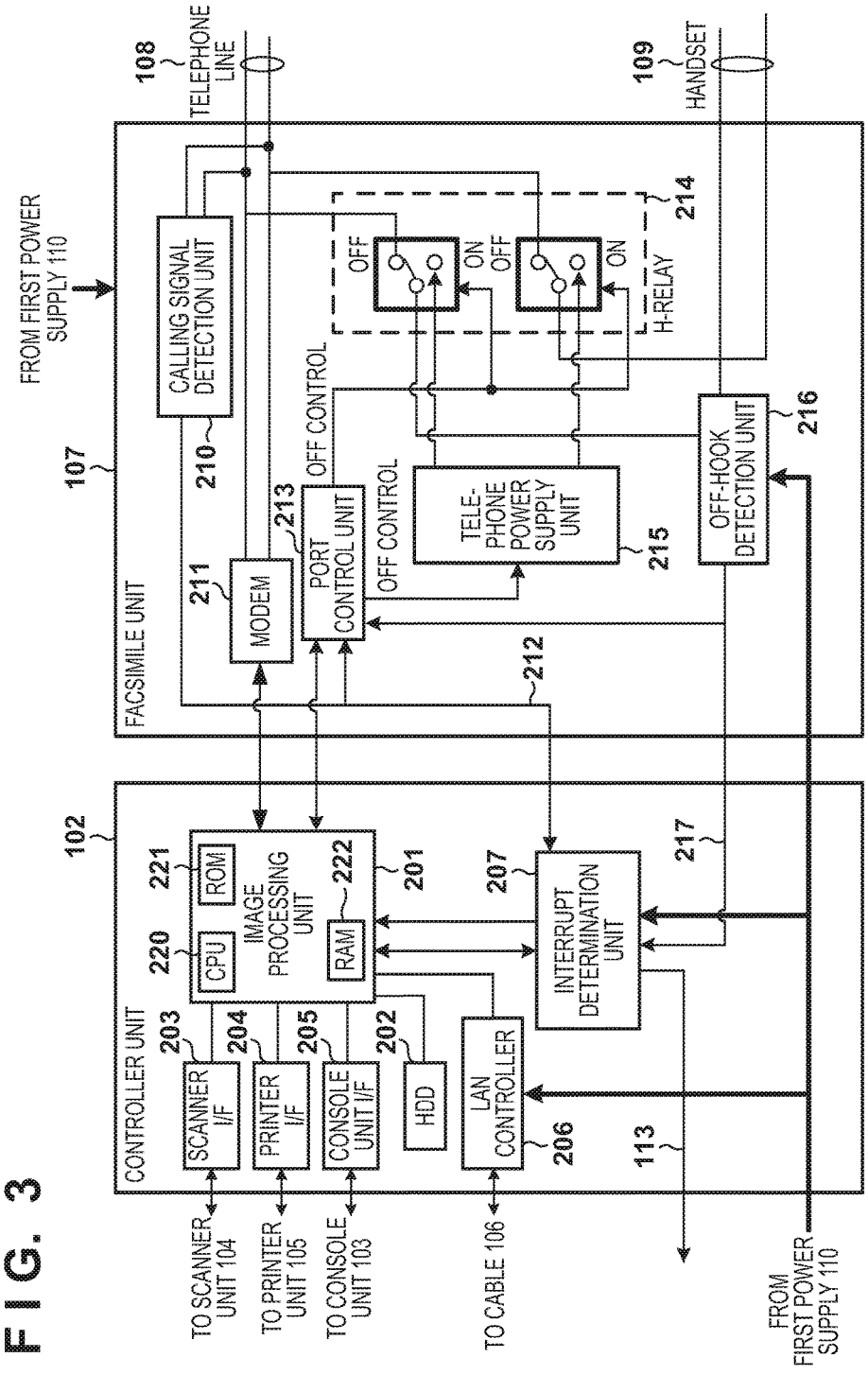

FIG. 3 is a block diagram for describing in more detail the configuration of the controller unit 102 and the facsimile unit 107 of the multi-function peripheral 101 according to the first embodiment. Here, in particular illustration is given for a state in which the multi-function peripheral 101 is set to be ringing (H-relay 214 is turned off) at a time of standby and the internal power supply is off (power supply from the telephone power supply unit 215 is off). Note that, in FIG. 3, portions that are the same as those in FIG. 2 are indicated by the same reference numerals, and description thereof is omitted.

Figure 4:
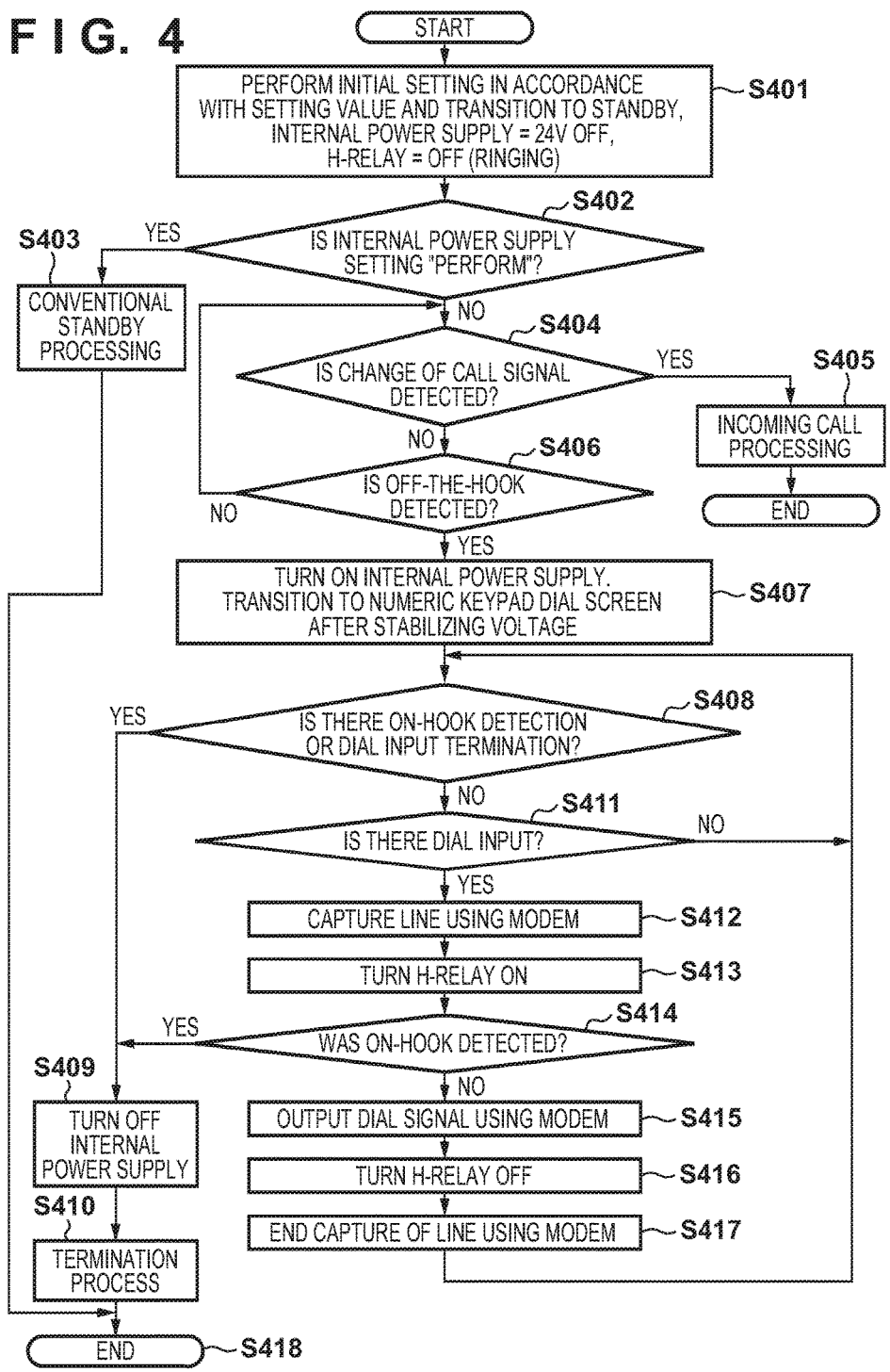

FIG. 4 is a flowchart for describing processing for when the multi-function peripheral 101 according to the first embodiment is standing by, an internal power supply is set to off, and the ringing mode is on. Note that the processing illustrated by this flowchart is achieved by the CPU 220 deploying a program stored in the ROM 221 or the HDD 202 to the RAM 222, and executing the program.

This processing is started in a state where the power supply for the multi-function peripheral 101 is turned on, and initialization for when the power is turned on has been performed. Firstly, in step S401, the CPU 220 reads a setting value for an internal power supply, a ringing mode value, and a facsimile reception mode setting value are saved in the HDD 202, performs an initial setting for facsimile in accordance with the setting values, and then transitions to a standby operation. Note that, if these setting values are saved in an internal flash memory of the image processing unit 201 instead of the HDD 202, reading is performed from the internal flash memory.

In the first embodiment, description is given for operation with the reception mode set to automatic reception, the ringing mode set to ring, and the internal power supply setting set to a "no" setting. The CPU 220 turns the H-relay 214 off if the ringing mode is set to "ring". In addition, because the internal power supply setting is "no", the CPU 220 stops power supply output for the telephone power supply unit 215. When the H-relay 214 is off, as illustrated in FIG. 3, the handset 109 is connected to the telephone line 108, and, by the off-hook detection unit 216, it is possible to detect raising of the handset 109 in accordance with direct current power supply (normally 48V) from the exchanging system.

Next, the processing advances to step S402, and the CPU 220 reads the internal power supply setting value to determine whether there is a setting to "perform" the internal power supply. When "perform" is determined for the internal power supply, the processing advances to step S403 because characteristic processing is unnecessary. In step S403, the CPU 220 continues conventional processing to wait for a job that is performed when standing by. The processing does not change until the internal power supply setting value changes. If the internal power supply setting value changes, the processing of the CPU 220 first advances to step S418 and ends, and then a transition is made to step S401 to start the processing again.

Meanwhile, upon determining in step S402 that the internal power supply is set to "no", the CPU 220 advances the processing to step S404. In step S404, the CPU 220 determines whether or not change of the call signal has been detected. When it is determined that there is a change of the call signal, the processing proceeds to step S405, and when that is not the case the processing proceeds to step S406. In step S405, the CPU 220 performs incoming call processing. This is the same as conventional incoming call processing, and after incoming call processing for fax reception or the like ends, the CPU 220 advances the processing to step S418 to cause the series of processing to end, and subsequently transitions to step S401, and starts in the standby state again.

In step S406, the CPU 220 determines whether there has been detection of off-hook (raising) of the handset 109. When it is determined that there was an off-hook detection, the processing advances to step S407, and when it is determined that there was no off-hook detection, the processing advances to step S404. Step S407 is characteristic processing of the first embodiment, and the CPU 220 performs control for turning the internal power supply on regardless of the setting for the internal power supply. At this point, the CPU 220 controls the port control unit 213 to cause a direct current 24V power supply from the telephone power supply unit 215 to start. After the direct-current voltage stabilizes, it is possible to detect an off-hook (raising) of the handset when the H-relay 214 is on. The exchanging system often supplies direct current 48V power, but, even if direct current 24V power is supplied from the telephone power supply unit 215, there is no problem because current of a threshold value or more flows to the off-hook detection unit 216 when the handset is raised. A numeric keypad dial screen indicating "please input a telephone number" is displayed on the console unit 103, and a user is prompted to input a telephone number. By this, the user can use a touch panel or the numeric keypad of the console unit 103 to make an instruction by inputting a telephone number. The processing of the CPU 220 then transitions to step S408.

In step S408, the CPU 220 determines whether on-hook of the handset 109 has been detected, whether there is a transmission/reception instruction, or whether there is a dial end instruction. It is determined whether or not a user has instructed that there be no more output of a dial signal from the modem 211 by a user putting the handset 109 on-hook, performing a transmission/reception instruction from the console unit 103, pressing a dial end key, or the like. Configuration may be taken such that the determination of step S408 is always performed in the background in parallel during step S411 through step S417 in order to quickly reflect an instruction to cancel output of the dial signal. When it is determined in step S408 that there is a detection of on-hook of the handset 109, a transmission/reception instruction, or a dial end instruction, the processing of the CPU 220 transitions to step S409, and when this is not the case the processing transitions to step S411. Step S409 is characteristic processing of the first embodiment, and the CPU 220 performs control for turning the internal power supply off regardless of the setting for the internal power supply. This step is transitioned to when there is an instruction from a user so that output of a dial signal from the modem 211 is not to be performed any more, such as placing the handset 109, performing a fax transmission or reception instruction, or performing a dial end instruction. In step S409, the CPU 220 controls the port control unit 213 to turn the telephone power supply unit 215 off and stop internal power supply. By this detection of off-hook (raising) of the handset ceases to be possible when the H-relay 214 is on, but because the state set initially in step S401 is returned to, it is possible to reduce power consumption. After the direct-current voltage decreases and stabilizes at a certain voltage, the processing of the CPU 220 transitions to step S410. In step S410, the CPU 220 performs processing for ending. In step S410, the console unit 103 is returned to a standby state when the handset 109 is placed, a dial end instruction is performed, or output of the dial signal is cancelled. Alternatively, fax transmission processing is performed when a fax transmission is instructed. The processing of step S410 is similar to a screen transition, a fax transmission, or a fax reception, which are conventionally performed and cancel output of the dial signal. In the case of a fax transmission, the CPU 220 captures the line by the modem 305, subsequently turns the H-relay 214 on because the output level is influenced by the handset 109, and disconnects the handset 109 from the telephone line 108. The CPU 220 then controls the modem 305 to perform fax transmission processing. It is similar for a fax reception. When processing that was instructed ends, the processing of the CPU 220 advances to step S418 and ends in order to return to the standby state.

In step S411, the CPU 220 determines whether or not there is a dial input from the console unit 103. When it is determined that a user used the touch panel or the numeric keypad of the console unit 103 to input a telephone number, the processing advances to step S412, and when it is determined that a telephone number was not inputted, the processing advances to step S408. In step S412, the CPU 220 performs line capture processing by the modem 211. This step is transitioned to in order to output a dial signal from the modem 211 when the user inputs a telephone number. The processing then proceeds to step S413, and the CPU 220 performs processing for turning the H-relay 214 on. This is to turn the H-relay 214 on to disconnect the handset 109 from the telephone line 108, because there is an influence on an output level if a DTMF signal is outputted from the modem 211 while the handset 109 is connected to the telephone line 108. Because there is an influence on a waveform even with pulse dialing, similar processing is performed. The processing proceeds to step S414, and the CPU 220 determines whether or not there has been detection of an on-hook (placing) of the handset 109. When an on-hook of the handset 109 is detected here, the processing proceeds to step S409, and otherwise the processing proceeds to step S415.

Here, when the control of step S407 which is a characteristic of the first embodiment is not performed, the following problem occurs when step S414 is transitioned to. Description is given regarding this problem with reference to FIG. 11.

Figure 11:
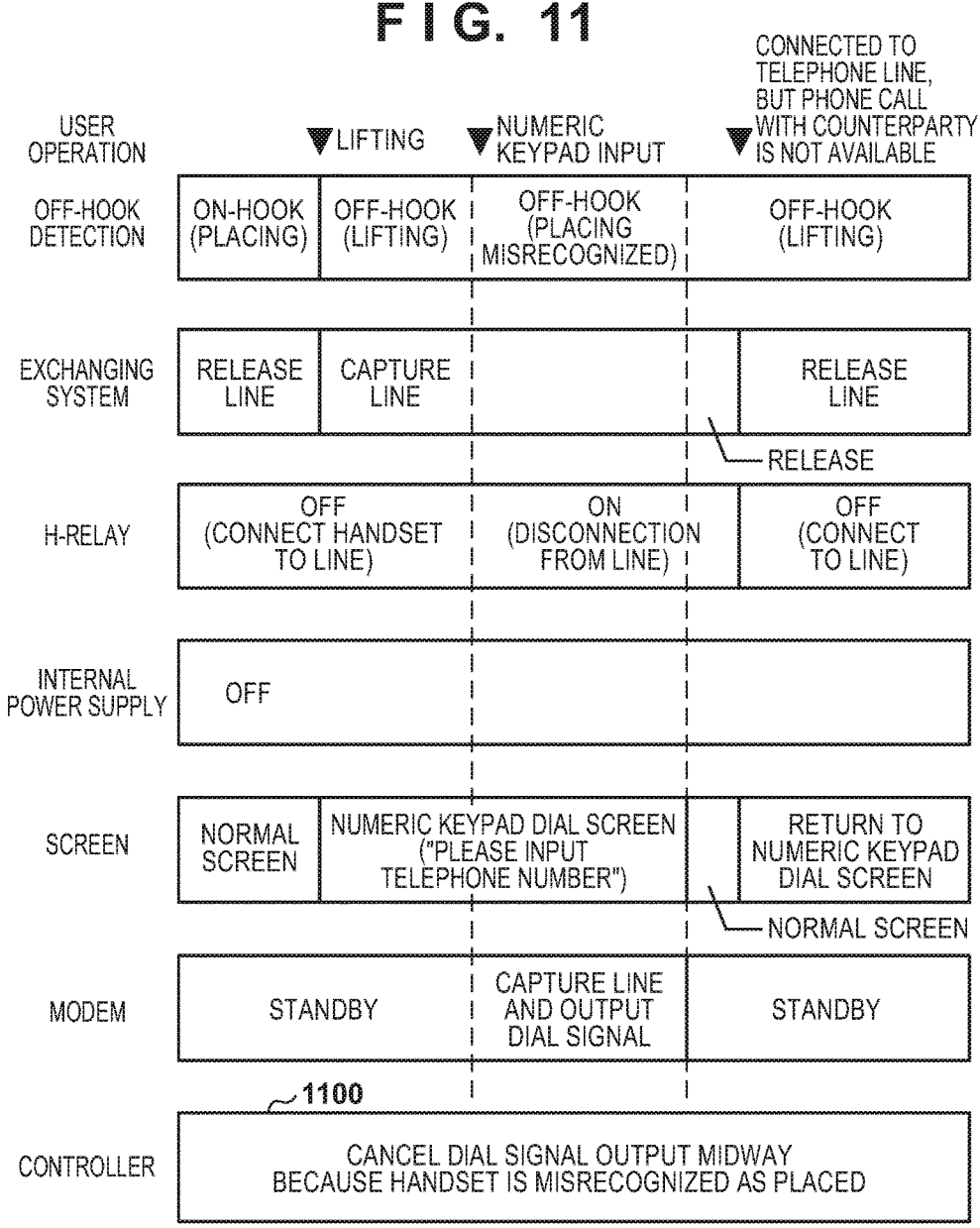
FIG. 11 is a time chart for describing a state of the internal power supply and the relay in a conventional example.

FIG. 11 depicts a view for explaining an example where the problem occurs with a time chart illustrating the states of an internal power supply and a relay in a conventional example.

Because power supply from the telephone power supply unit 215 stops when the control of step S407 for turning the internal power supply on is not performed, a state where a direct-current voltage is not applied to the handset is entered when the H-relay 214 is turned on, and the power supply to the off-hook detection unit 216 is cut off. As illustrated by reference numeral 1100 of FIG. 11, although a user has not placed the handset, the CPU misrecognizes that the user has placed the handset. Because determination of whether the handset is on-hook is not performed during this, it is treated as though the handset has been put on the hook, and the CPU cancels output of the dial signal, ends line capture by the modem, and returns the H-relay 214 to off in order to connect the handset to the telephone line. Because the user has not placed the handset on the hook even after the standby state is returned to, the handset first captures the telephone line but, because output of the dial signal has been cancelled, a problem that a telephone call with a desired counterparty cannot be made occurs.

With respect to this, in the first embodiment it is possible to resolve the above problem by performing the control of step S407. In the first embodiment, because the internal power supply has been turned on in step S407, a direct-current voltage continues to be applied to the handset 109 even if, in step S413, the H-relay 214 is turned on and the handset 109 is cut off from the line, and thus the power supply to the off-hook detection unit 216 is not cut off. Consequently, because misrecognition of an on-hook as described above does not occur, a user can make a phone call with a desired counterparty.

Returning to FIG. 4 again, in step S415 the CPU 220 performs processing for outputting a dial signal by the modem 211. The CPU 220 controls the modem 211 to output, at a predetermined output level, a DTMF signal corresponding to an instructed telephone number. Note that, in the case of a setting for pulse instead of tone, the CPU 220 controls the modem 211 to output, at predetermined timings, a dial signal corresponding to an instructed telephone number. The dial signal is outputted by performing direct current capture and direct current release at predetermined timings. The processing then proceeds to step S416, and the CPU 220 performs processing for turning the H-relay 214 off. This is to enable a user to make a phone call by reconnecting the raised handset 109 to the telephone line 108. The processing proceeds to step S417, and the CPU 220 causes the line capture by the modem 211 to end. This is because line capture by the modem 211 is not necessary as the handset 109 raised by the user has already captured the line. The processing of the CPU 220 then returns to step S408. In step S418, the CPU 220 causes the series of processing to end. The CPU 220 transitions to step S401 in order to make a transition to the standby state again.

Figure 7:
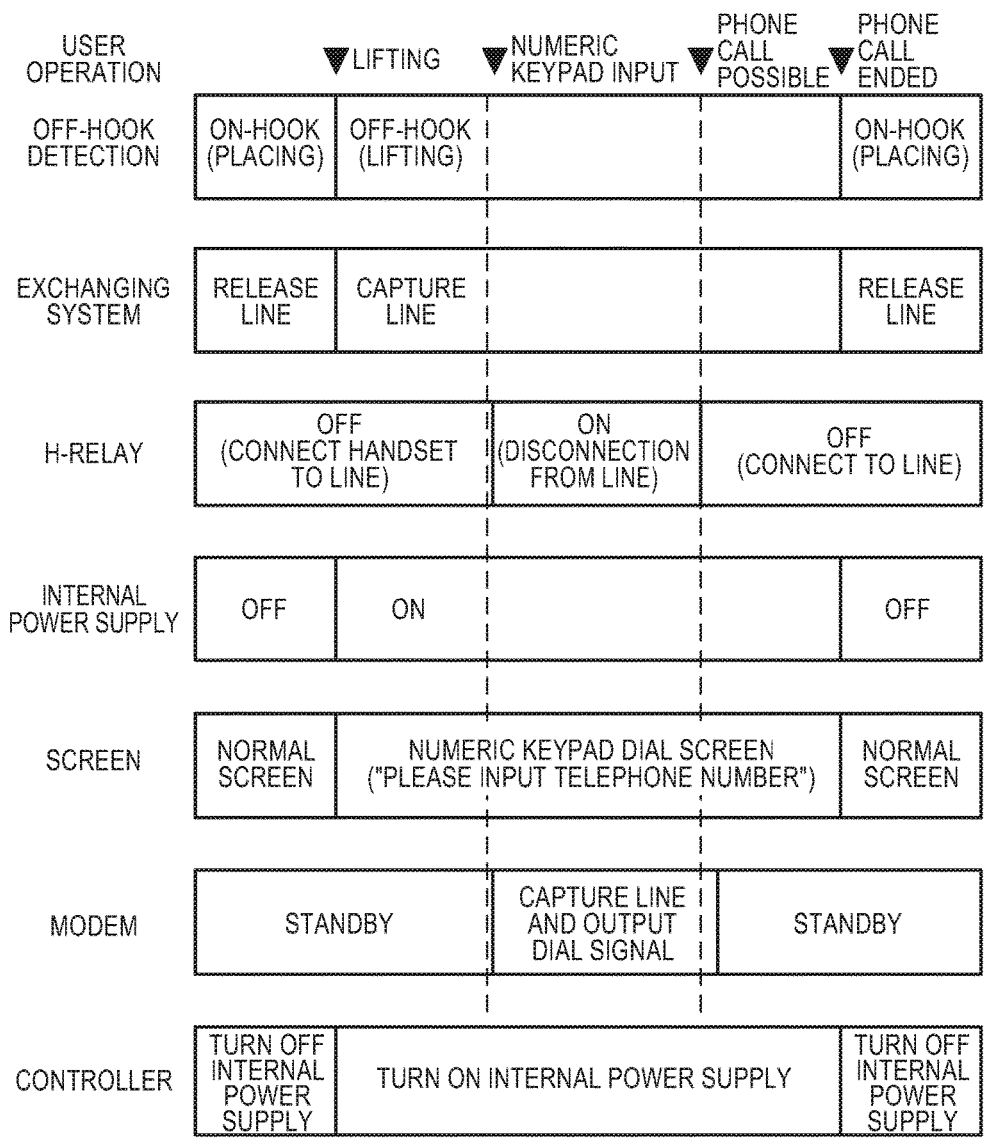
FIG. 7 is a time chart for describing a state of the internal power supply and a relay of the multi-function peripheral according to the first embodiment.

When processing is performed in accordance with the flowchart illustrated in FIG. 4, the state for the internal power supply, the relay, and the like transitions as in the time chart illustrated in FIG. 7, and the above problem does not occur.

FIG. 7 is a time chart for describing a state of the internal power supply and a relay of the multi-function peripheral 101 according to the first embodiment.

By performing the processing of the first embodiment, at the time of a standby when the internal power supply is set to off and the ringing mode is set, the internal power supply is set to on in step S407 when an off-hook is detected, even if the internal power supply setting is set to off. Consequently, even in a case where the handset 109 is raised and a dial operation is performed using the console unit 103, it is possible to provide a facsimile function that enables a phone call with a counterparty without changing the setting for the internal power supply.

Second Embodiment

In the second embodiment, description is given regarding control by the CPU 220 when, at a time of a standby illustrated in FIG. 3, the internal power supply is set to off and the ringing mode is set, in other words when the H-relay 214 is off and the telephone power supply unit 215 is off. Note that, because a hardware configuration or the like of the multi-function peripheral 101 according to the second embodiment is similar to that of the first embodiment described above, description thereof is omitted.

Figure 5:
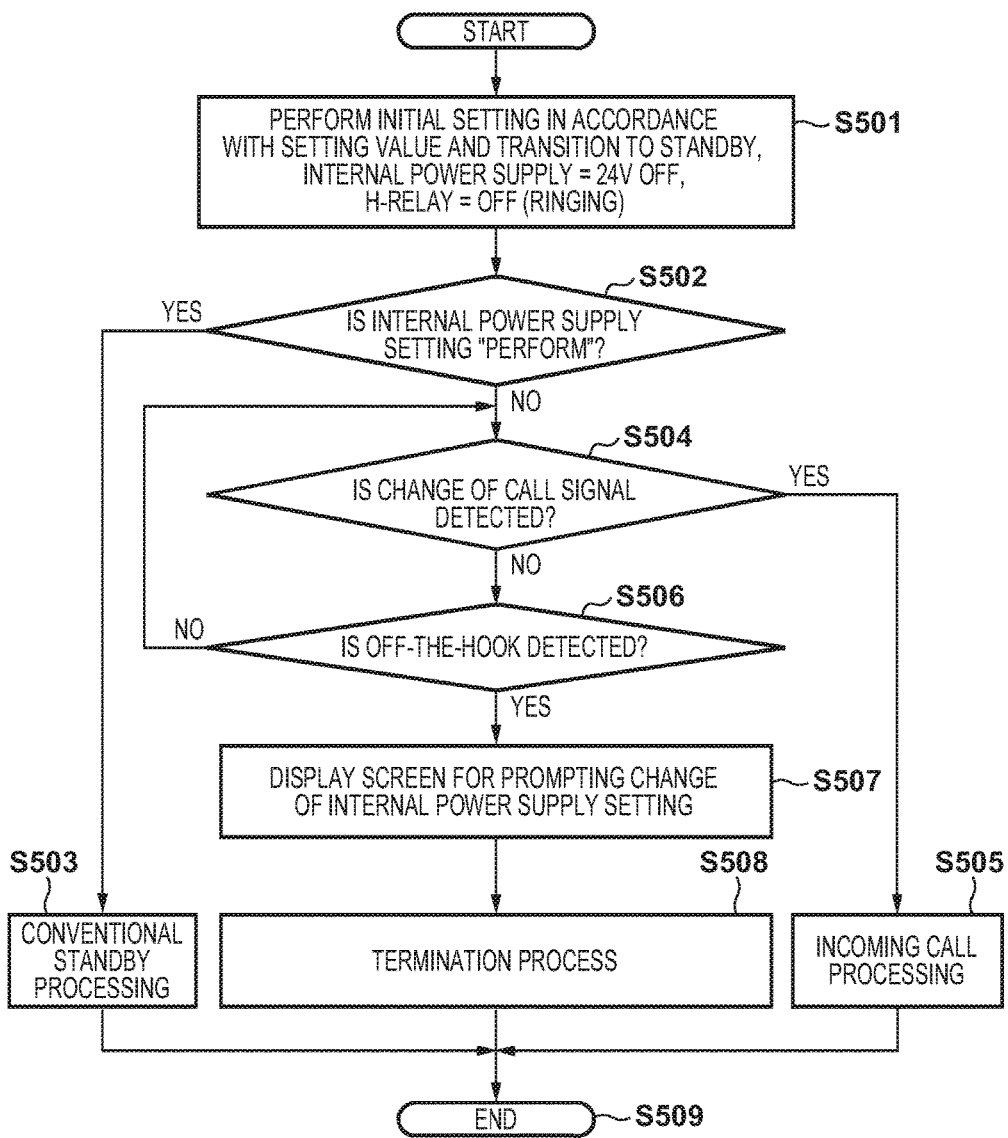

Description is given, by the flowchart of FIG. 5, of a control procedure of the second embodiment that is performed by the CPU 220 in a case where a user raises the handset 109 and makes a call at a time of a standby with the internal power supply set to off and the ringing mode set.

FIG. 5 is a flowchart for describing processing for when the multi-function peripheral 101 according to the second embodiment is standing by, an internal power supply is set to off, and the ringing mode is on. Note that the processing illustrated by this flowchart is achieved by the CPU 220 deploying a program stored in the ROM 221 or the HDD 202 to the RAM 222, and executing the program.

Firstly, a state where the power supply for the multi-function peripheral 101 is turned on, and initialization for when the power is turned on has been performed is entered. The processing of the CPU 220 transitions to step S501, and starts the processing. The processing of step S501 through step S506 is the same as the processing of step S401 through step S406 of FIG. 4 described above, and thus description thereof is omitted.

Step S507 is processing that is characteristic of the second embodiment, and the CPU 220 displays a screen for prompting a change to the internal power supply setting. Step S507 is alternative processing that is performed instead by the multi-function peripheral 101 which does not perform step S407 of the first embodiment.

As described in the first embodiment, in the case where the internal power supply setting is off, when there is a dial operation using the console unit 103 after the handset 109 is connected and taken off-hook, line current is temporarily disconnected part way through, making it impossible to have a phone call with a counterparty. Accordingly, in step S507, the CPU 220, upon detecting that the handset 109 has been taken off-hook at the time of a standby, displays a warning screen to the screen of the console unit 103. On this screen is displayed "please change the internal power supply setting from "no" (off)→"perform" (on) in case of performing numeric keypad dialing", and a user is prompted to change the setting for the internal power supply.

Configuration may be taken to subsequently cause the screen of the console unit 103 to automatically transition to the setting screen illustrated in FIG. 12, and prompt a user to set and save the internal power supply setting to "perform". Alternatively, configuration may be taken to display on the screen of the console unit 103 "There is a need to change the internal power supply setting from "no"→"perform" when performing numeric keypad dialing. Make the change?", and cause a user to select one of "yes" or "no". When the user selects "yes", the CPU 220 saves the internal power supply setting after setting it to "perform". Meanwhile, when the user selects "no", the internal power supply setting is not changed. The processing of the CPU 220 advances to step S508, and the CPU 220 performs processing for ending. Here, in a case where a user places the handset 109 (on-hook) to cancel dialing, the display of the console unit 103 is returned to the standby state. When the processing ends, the processing of the CPU 220 advances to step S509 in order to return to the standby state. In step S509, the CPU 220 causes the series of processing to end. The CPU 220 advances the processing to step S501 in order to make a transition to the standby state again. When a user saves the internal power supply setting in step S507 after setting it to "perform" from "no", the problem does not occur in step S502 because the internal power supply is set to "perform".

Figure 8:
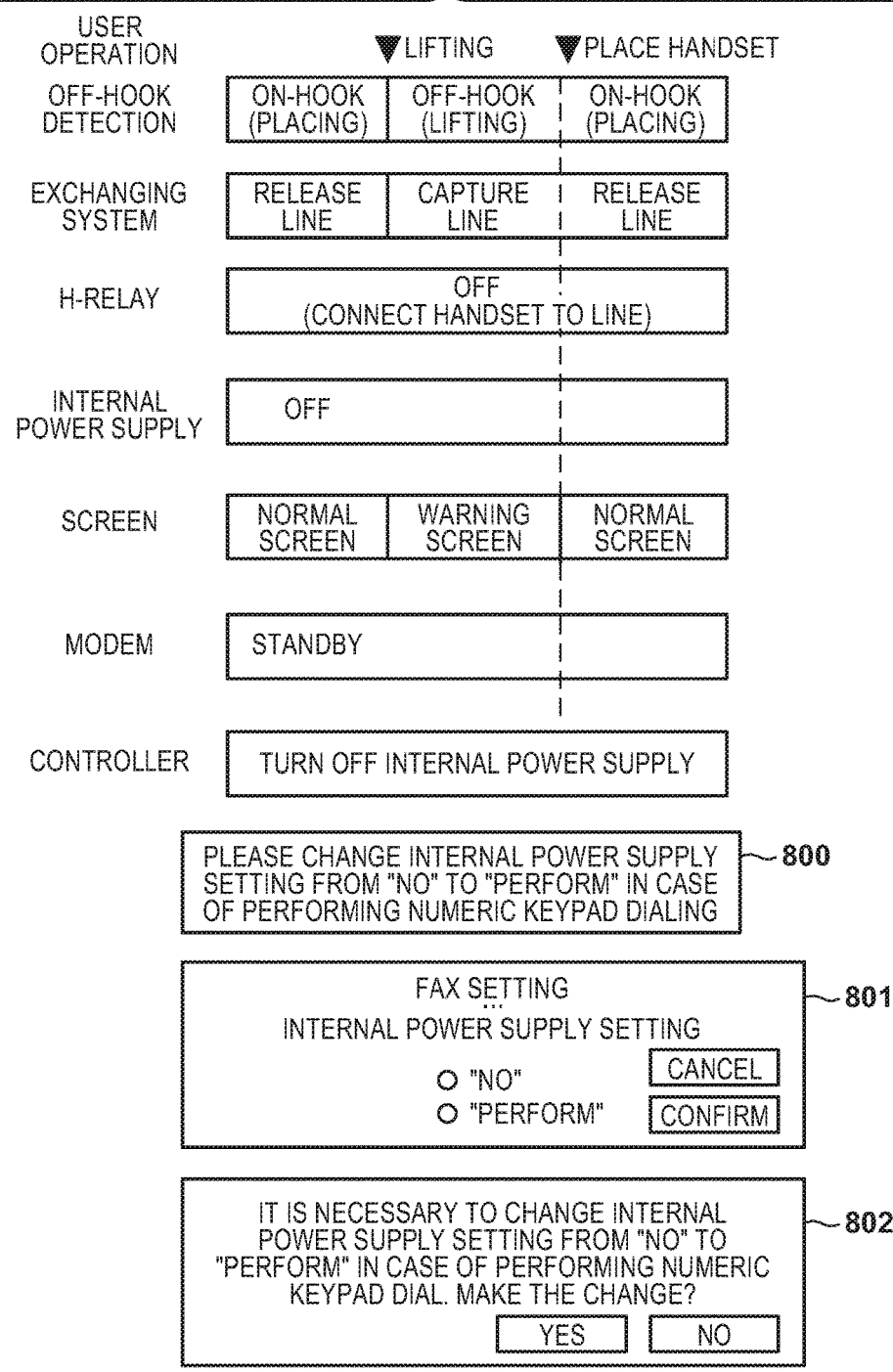
FIG. 8 depicts a view for explaining examples of warning screens that are displayed in step S507, in the multi-function peripheral according to the second embodiment.

FIG. 8 depicts a view for explaining examples of warning screens that are displayed in step S507, in the multi-function peripheral 101 according to a second embodiment.

Reference numeral 800 indicates an example of a screen prompting a change of the internal power supply setting from "no"→"perform" in the case of using the numeric keypad to dial, because this change is necessary. Reference numeral 801 indicates an example of a separate warning screen, and here it is possible to select whether to have "no" or "perform" for the internal power supply setting by radio buttons and make this selection by pressing a confirmation button, in FAX settings. Reference numeral 802 indicates an example of a screen in which it is possible to select "yes" or "no" for whether to perform a change of the internal power supply setting from "no"→"perform" in the case of using the numeric keypad to dial, because this change is necessary.

By virtue of the second embodiment as described above, at a time of ringing standby where the internal power supply setting is off and the H-relay is off to reduce power consumption, it is possible to perform a display on the console unit 103 for prompting a user to change the internal power supply setting when a user lifts the handset. Consequently, it is possible to warn a user that operation will not be as intended by the user unless the setting for the internal power supply is changed.

In addition, an easy to understand user interface is provided by automatically transitioning to an example of an internal power supply setting screen.

In addition, by asking a user whether or not to change the internal power supply setting, it is possible to change this setting in accordance with an instruction by a user, and thus it is possible to provide a user interface that is easy to understand for the user.

In this way, even with ringing standby for reducing power consumption, by changing the internal power supply from "no" to "perform" and saving that setting, it is possible to provide a multi-function peripheral that enables a phone call with a counterparty, even if a user performs an operation to dial after raising the handset.

Third Embodiment

In the third embodiment, description is given regarding control by the CPU 220 when, at a time of a standby illustrated in FIG. 3, the internal power supply is set to "no" and the ringing mode is set, in other words when the H-relay 214 is off and the telephone power supply unit 215 is off. Description is given, by the flowchart of FIG. 6, of a control procedure of the third embodiment that is performed by the CPU 220 in a case where a user raises the handset 109 and makes a call at a time of a standby with the internal power supply set to "no" and the ringing mode set. Note that, because a hardware configuration or the like of the multi-function peripheral 101 according to the third embodiment is similar to that of the first embodiment described above, description thereof is omitted.

Figure 6:
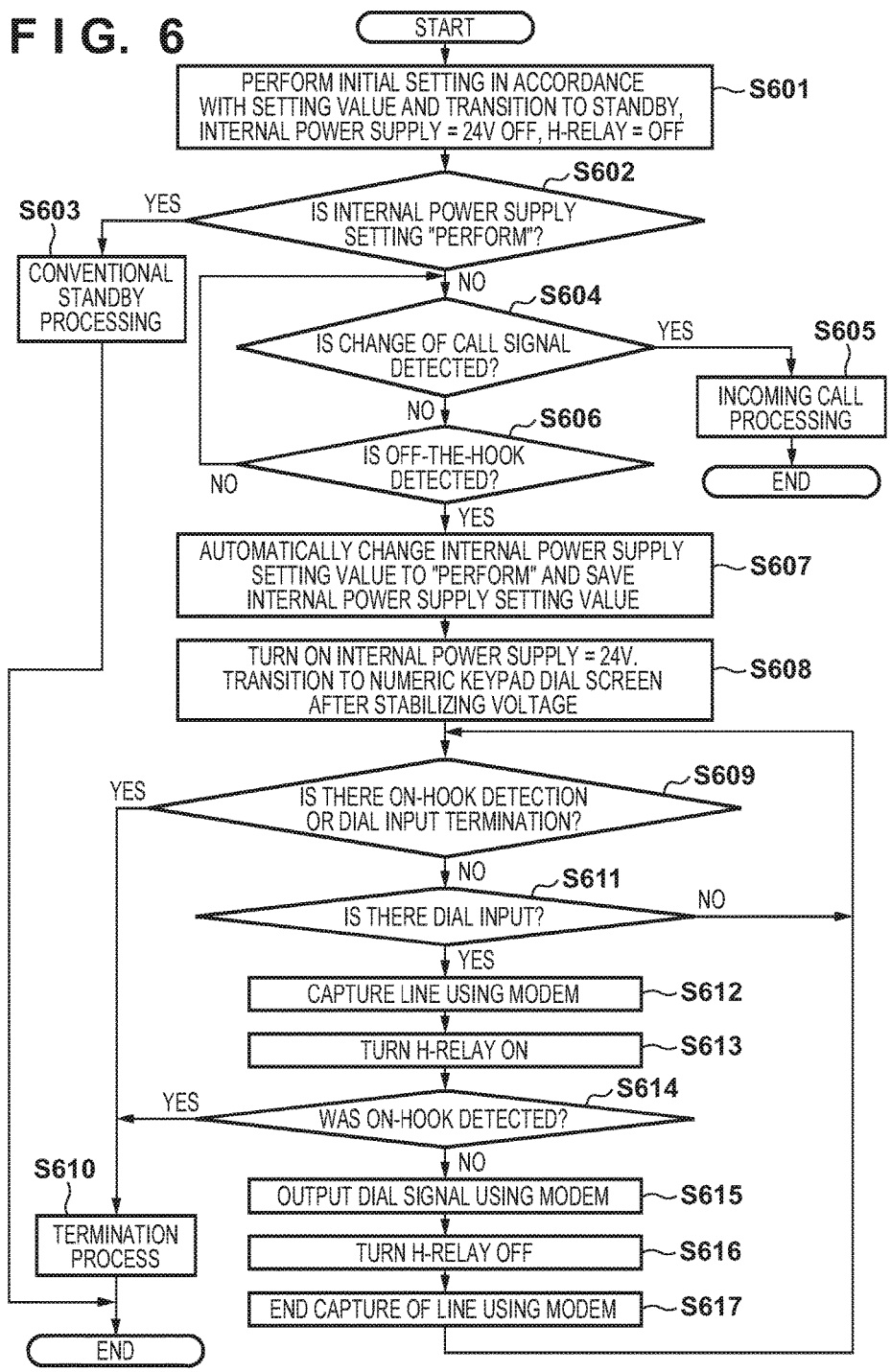

FIG. 6 is a flowchart for describing processing for when the multi-function peripheral 101 according to the third embodiment is standing by, an internal power supply is set to off, and the ringing mode is on. Note that the processing illustrated by this flowchart is achieved by the CPU 220 deploying a program stored in the ROM 221 or the HDD 202 to the RAM 222, and executing the program. The processing of step S601 through step S606 of FIG. 6 is the same as the processing of step S401 through step S406 of FIG. 4 described above, and thus description thereof is omitted.

Step S607 is processing that is characteristic in the third embodiment, and the CPU 220 automatically changes the internal power supply setting value to "perform", and saves this setting in the HDD 202 or an internal flash memory of the image processing unit 201. As described in the first embodiment, in the case where the internal power supply setting is off, when there is a dial operation using the console unit 103 after the handset 109 is connected and raised off-hook, line current is temporarily disconnected part way through, making it impossible to have a phone call with a counterparty. Consequently, in step S607, the CPU 220 displays "the internal power supply setting is changed to "perform"" on the screen of the console unit 103 to notify a user that the setting value has been automatically changed. The CPU 220 then advances to the processing of step S608.

In step S608, the CPU 220 performs control for turning the internal power supply on in accordance with the change of the internal power supply setting value, and displays the numeric keypad dial screen. Specifically, the CPU 220 controls the port control unit 213 to cause a direct current 24V power supply from the telephone power supply unit 215 to start. After the direct-current voltage is stabilizes, it is possible to detect an off-hook (raising) of the handset 109. A numeric keypad dial screen indicating "please input a telephone number" is displayed on the console unit 103, and a user is prompted to input a telephone number. By this, the user can use a touch panel or the numeric keypad of the console unit 103 to input a telephone number. The processing of the CPU 220 then transitions to step S609. Because the same processing as in step S408 is performed in step S609, description thereof is omitted. The processing of step S610 through step S617 is the same as the processing of step S410 through step S417 of FIG. 4 described above, and thus description thereof is omitted.

Figure 9:
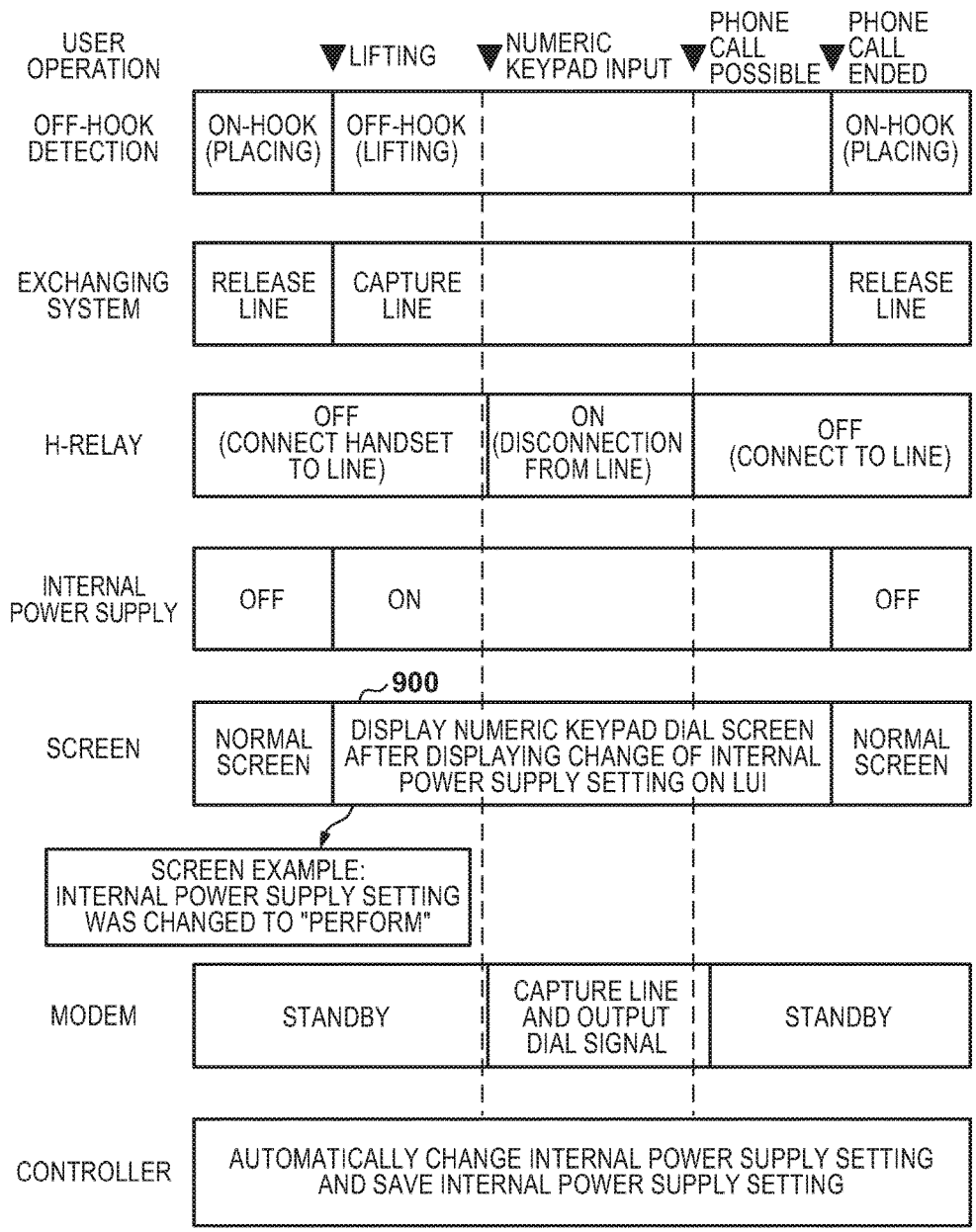
FIG. 9 is a time chart for describing a state of the internal power supply and a relay of the multi-function peripheral according to the third embodiment.

FIG. 9 is a time chart for describing a state of the internal power supply and a relay of the multi-function peripheral according to the third embodiment. As illustrated by FIG. 9, at reference numeral 900 where off-hook of the handset 109 is detected, the internal power supply setting is automatically changed to "perform" and saved, and thus the internal power supply has been changed to on in subsequent processing. Consequently, it is possible to detect an off-hook (raising) of the handset, and "please input a telephone number" and a numeric keypad dial screen are displayed on the console unit 103 to enable dial input by a user.

By virtue of the third embodiment as described above, at a time of ringing standby where the internal power supply is off and the H-relay is off to reduce power consumption, a notification is displayed on the console unit after automatically changing the internal power supply setting when a user lifts the handset. In this way, by automatically changing the internal power supply setting from "no" to "perform", it is possible to provide a multi-function peripheral that enables a phone call with a counterparty even in the case where the handset is raised to make a dial operation in ringing standby for reducing power consumption.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-168834, filed Sep. 1, 2017, which is hereby incorporated by reference herein in its entirety.

What is claimed is:

1. A facsimile apparatus, comprising:
a detection unit configured to detect an off-hook and an on-hook of a connected telephone device;
a switching unit configured to switch between connecting and cutting off a connection between the telephone device and a telephone line;
a power supply configured to supply power to the telephone device via the switching unit;
an operation unit configured to select a ringing mode for causing the telephone device to ring or a non-ringing mode for not causing the telephone device to ring;
a memory device that stores a set of instructions; and
a processor that executes the instructions stored in the memory device to:
in a state where the ringing mode is selected by the operation unit, the telephone device and the telephone line are connected by the switching unit, and the power is not supplied to the telephone device from the power supply, control to start supply of power to the telephone device from the power supply when an off-hook of the telephone device is detected by the detection unit.

2. The facsimile apparatus according to claim 1, further comprising:
a modem configured to perform facsimile communication with a partner device via the telephone line,
wherein the processor executes the instructions stored in the memory device to:
in a case that an off-hook of the telephone device is detected by the detection unit and there is a dial input, capture the telephone line by the modem to cut off the connection between the telephone device and the telephone line by the switching unit, and
in a case that an on-hook of the telephone device is detected by the detection unit, cause the modem to output a dial signal and subsequently connect the telephone device and the telephone line by the switching unit.

3. The facsimile apparatus according to claim 1, wherein the processor executes the instructions stored in the memory device to control to:
in a case that an off-hook of the telephone device is detected by the detection unit, display a screen for prompting a user to make a setting for starting supply of power to the telephone device by power, and start supply of power to the telephone device from the power supply in accordance with a setting by a user via the screen.

4. The facsimile apparatus according to claim 1, wherein the processor executes the instructions stored in the memory device to control to:
in a case that an off-hook of the telephone device is detected by the detection unit, save a setting value for supplying power from the power supply to the telephone device, and start supply of power to the telephone device from the power supply based on the setting value.

5. The facsimile apparatus according to claim 1, wherein the processor executes the instructions stored in the memory device to control to:
in a case that an off-hook of the telephone device is detected by the detection unit, start supply of power from the power supply to the telephone device, and subsequently stop supply of power from the power supply to the telephone device if an on-hook of the telephone device is detected by the detection unit.

6. The facsimile apparatus according to claim 1, wherein the detection unit, when in the ringing mode, detects an off-hook or an on-hook of the telephone device based on power supplied from the telephone line, and when in the non-ringing mode, detects an off-hook and an on-hook of the telephone device based on supply of power to the telephone device from the power supply.

7. A method of controlling a facsimile apparatus, the method comprising:
- detecting an off-hook and an on-hook of a connected telephone device;
- switching between connecting and cutting off for a connection between the telephone device and a telephone line;
- supplying power to the telephone device;
- selecting a ringing mode for causing the telephone device to ring or a non-ringing mode for not causing the telephone device to ring; and
- in a state where the ringing mode is selected, the telephone device and the telephone line are connected, and the power is not supplied to the telephone device from the power supply, controlling to start supply of power to the telephone device from the power supply when an off-hook of the telephone device is detected.

8. A non-transitory computer-readable storage medium storing a program for causing a processor to execute a method of controlling a facsimile apparatus, the method comprising:
- detecting an off-hook and an on-hook of a connected telephone device;
- switching between connecting and cutting off for a connection between the telephone device and a telephone line;
- supplying power to the telephone device;
- selecting a ringing mode for causing the telephone device to ring or a non-ringing mode for not causing the telephone device to ring; and
- in a state where the ringing mode is selected, the telephone device and the telephone line are connected, and the power is not supplied to the telephone device from the power supply, controlling to start supply of power to the telephone device from the power supply when an off-hook of the telephone device is detected.

* * * * *